United States Patent [19]
Frister

[11] 4,289,449
[45] Sep. 15, 1981

[54] FAN WHEEL FOR ELECTRIC MACHINERY

[75] Inventor: Manfred Frister, Schwieberdingen, Fed. Rep. of Germany

[73] Assignee: Robert Bosch GmbH, Stuttgart, Fed. Rep. of Germany

[21] Appl. No.: 5,364

[22] Filed: Jan. 22, 1979

[30] Foreign Application Priority Data

Feb. 4, 1978 [DE] Fed. Rep. of Germany ....... 2804756

[51] Int. Cl.³ .............................................. B63H 1/16
[52] U.S. Cl. ..................................... 416/185; 74/574; 416/229 R; 416/241 A; 416/500
[58] Field of Search ............... 416/185, 241 A, 229 R, 416/500, 182; 310/62; 74/574

[56] References Cited

U.S. PATENT DOCUMENTS

| 1,827,316 | 10/1931 | Haynsworth | 416/185 |
| 3,387,505 | 6/1968 | Rumsey | 74/574 |
| 3,521,973 | 7/1970 | Schouw | 416/185 |
| 3,670,593 | 6/1972 | Troyer | 74/574 |
| 4,169,693 | 10/1979 | Brubaker | 416/241 A |

FOREIGN PATENT DOCUMENTS

| 1503584 | 7/1970 | Fed. Rep. of Germany ... 416/241 A |
| 2523230 | 12/1976 | Fed. Rep. of Germany ...... 416/229 |
| 702287 | 1/1954 | United Kingdom ........... 416/241 A |
| 1275916 | 6/1972 | United Kingdom ................. 310/62 |

Primary Examiner—Leonard E. Smith
Attorney, Agent, or Firm—Frishauf, Holtz, Goodman & Woodward

[57] ABSTRACT

To prevent the generation of noise from axial oscillations of the fan wheel on electric machinery, especially motors and generators in motor vehicles, the fan wheel is composed of a support assembly consisting of a plurality of adjacent metal discs or rings, surrounded by a preferably molded plastic fan circle in which the fan blades are embedded. The component discs of the support assembly may be of different thickness to provide different natural resonant frequencies, thereby further suppressing axial oscillations.

4 Claims, 4 Drawing Figures

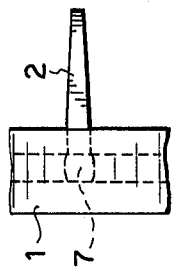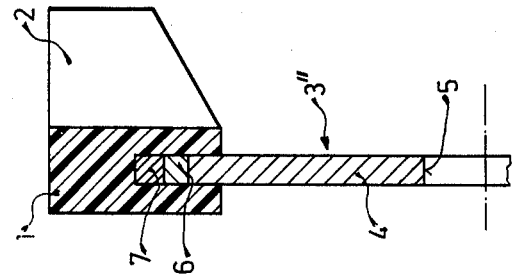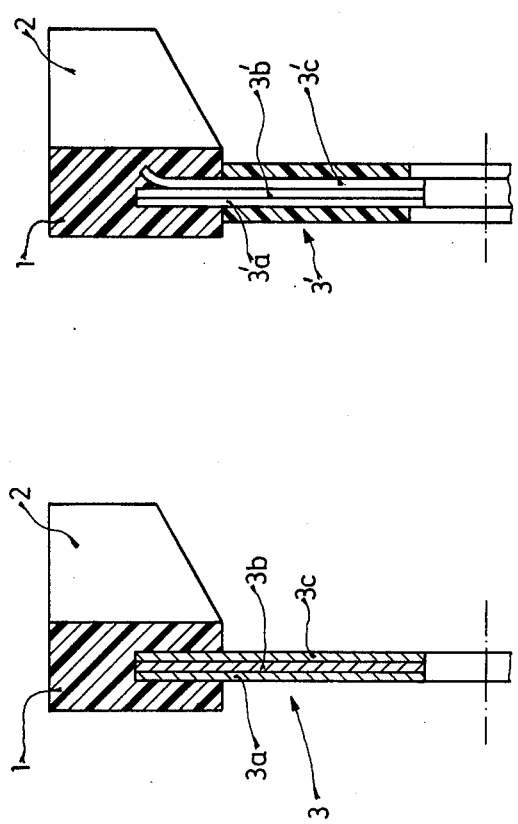

FAN WHEEL FOR ELECTRIC MACHINERY

The invention relates to fan wheels or ventilator fans for electric machinery, especially A.C. or D.C. generators.

BACKGROUND AND STATE-OF-THE-ART

Electric machines, especially A.C. or D.C. generators for motor vehicles usually are equipped with ventilating fan wheels. The fan blades are located on an outer blade circle which is held in position by a disc-like central portion having a suitable bore for receiving the shaft of the machine. The fan wheel may be mounted within or externally of the housing of the machine and is rotated by the shaft of the electric machine. The fan wheel supplies a substantially axial air stream to cool the electric generator or motor. Normally, the fan wheel has an outer blade circle with fan blades that extend in the axial direction and which are so disposed as to cause an axial air flow. The fan blades are often of one piece with a holding device which is mounted on the shaft of the machine. These fan wheels may be of plastic with metal inserts to increase the rigidity. Also known are fan wheels made entirely of aluminum, for example pressure castings, or simple metal foil fan wheels which are stamped out in one piece. It is a disadvantage of the known fan wheels that substantial vibration and noise generation may occur which is not caused by the air flow alone. In rotating electrical machines, electromagnetic and/or mechanical impulses may cause oscillations of the rotating members in directions parallel to the axis of rotation and these oscillations are radiated by the disc-shaped fan wheels as disturbing noises. The type of noise generation depends on the shape, the mass and the elastic properties as well as the interior damping of the fan wheel and is usually based on resonance phenomena. In order to counteract the noise generation, it is known to damp the simple metal foil fan wheels by placing on their disc-like surface damping masses. However, this step generally only shifts the generation of noise and vibration into other rpm domains.

THE INVENTION

It is a principal object of the invention to provide a fan wheel for electric machinery which is so constructed as to prevent or substantially reduce the generation of noise due to axial oscillations.

Briefly, providing that the fan wheel consists of an interior holding structure including a plurality of discs or rings; the fan blades are mounted on the outer radius of the holding structure as a separate entity. Due to this construction, the fan wheel experiences a high degree of damping, especially of oscillations which are parallel to the axis of rotation. Accordingly, the fan wheel acts as a damper for the oscillations of the machinery and thus achieves an overall quiet operation and long life of the machine.

Another advantage of the invention is that the fan wheel described herein is substantially simpler and less expensive to construct than the heretofore known designs. In one embodiment of the invention, the support portion of the fan wheel is a plurality of equally sized discs which are stacked together axially. Another feature of the invention is that the support portion of the fan wheel may be covered with a layer of whirl sintered material, thereby imparting to the fan wheel a greater resistance to higher temperatures as well as an overall protection against corrosion.

Further objects and features of the invention will become more apparent from the description of preferred examples which are related to the drawing.

BRIEF DESCRIPTION OF THE DRAWING

FIG. 1 is a sectional view through a portion of the fan wheel according to a first exemplary embodiment of the invention;

FIG. 2 is an illustration of a second embodiment of the invention illustrating the application of a protective coating;

FIG. 3 is a variant embodiment of the invention in which the holding member is constructed of coplanar rings; and FIG. 3a is a fragmentary top view of the fan wheel.

The basic purpose of the present invention is to so construct the fan wheel as to provide internal damping, i.e., to prevent the radiation of noises due to the existence of oscillations. Accordingly, the fan wheel is divided into two separate portions, i.e., an external fan ring, preferably embodied as a ring of plastic material in which the individual fan blades are embedded (FIG. 3a) and an interior support member which serves to support the fan ring and also serves for mounting the fan on the driving shaft of the machine FIG. 3a shows, schematically, a fragementary top view of the plastic ring 1, and a fan blade 2 embedded therein. The outer ring 7 is shown in broken line. The construction of the internal support member is of particular significance and, according to the present invention, it consists of several, i.e., at least two, adjacent parts. These parts may be disc-shaped or ring-shaped.

FIG. 1 illustrates a first embodiment of the invention showing an outer fan ring 1 carrying a plurality of fan blades 2. Supporting the fan ring 1 is a support assembly 3 consisting of several adjacent discs 3a, 3b, 3c which are stacked in the axial direction of the machine and preferably have equal radial extents. The assembly of discs 3 is surrounded radially by the ring-shaped plastic structure of the fan ring 1. The individual discs 3a–3c, which preferably are made of metal foil, may be merely placed in intimate contact but they may also be joined locally or over larger areas, for example by using an adhesive. The disposition of a plurality of relatively thin individual metal foils which are joined at least in the outer region by the surrounding annular plastic material constituting the fan circle 1, insures a substantial amount of internal damping, for example by friction between two adjacent metal foils, so that oscillations of the discs in directions parallel to the axis are sharply suppressed. The amount of damping can be still further increased by providing individual metal foils having different thickness so that the natural resonance frequencies of the discs are different. Accordingly, when the driving frequency changes, for example due to a speed change of the electric machine, different metal foils will act as dampers and will counteract the overall tendency of the disc structure to oscillate. Due to this construction, the support element of the fan blade becomes extremely insensitive to external oscillations and may in fact be able to damp the source of the oscillation, i.e., the electric machine, thereby contributing to the operational stability of the electric machine and to its increased lifetime.

FIG. 2 illustrates a second embodiment of the invention in which the support assembly 3' is composed of discs 3'a–3'c which are provided with external coatings of sintered material made of suitable plastic which serve to provide resistance of the fan wheel against higher temperatures and thus permits its use when the ambient temperatures are elevated. At the same time, the sintered covering provides a universal protection against corrosion.

A variant of the support assembly for the fan wheels of FIGS. 1 and 2 is illustrated in FIG. 3. In this example, the support assembly 3" consists of coplanar ring-shaped members i.e., internal disc 4 having a bore 5 for receiving the motor or generator shaft, and an adjacent annulus 6 of larger radius disposed as illustrated, i.e., in the same plane as the interior disc 4. Surrounding the ring 6 is a ring 7 of still larger radius. The interior bearing disc 4 is joined to the annuli 6 and 7 by being partly embedded in the plastic of the external fan ring 1 which extends over both of the rings 6 and 7 and over the outer regions of the discs 4. It will be appreciated that other or additional means of fastening could be provided. A construction as illustrated in FIG. 3 also serves to substantially damper the generation of oscillations in directions parallel to the axis. The use of simple metal discs for constructing the support assembly and surrounding these discs by a molded plastic fan ring permits a substantial reduction of the cost of fan wheels for electric machinery while at the same time providing strong internal damping which prevents the radiation of annoying noises due to axial oscillations of the fan wheel.

The foregoing embodiments of the invention are exemplary and non-limiting and other variants and embodiments are possible within the spirit and scope of the invention.

I claim:

1. A fan wheel for electrical machinery, especially generators used in motor vehicles, including an inner support assembly mounted on the shaft of the generator an outer fan ring supported by said support assembly, and wherein said support assembly is composed of a plurality of mutually adjacent component parts which comprise a disc-like portion and coplanar exterior rings adjacent said disc-like portion and positioned adjacent one another along their radial periphery, said exterior rings as well as the outer region of said disc-like portion being completely surrounded by molded plastic material constituting said fan ring (1)

and wherein said fan ring (1) is distinct from and joined to said support assembly.

2. A fan wheel according to claim 1, wherein said disc-like portion is of metal.

3. A fan wheel according to claim 1, further comprising external coatings applied to the outer surface of said support assembly, said coatings being sintered coatings of plastic material.

4. Fan wheel according to claim 1, wherein the fan ring comprises a ring of plastic material, and fan blades embedded in said plastic ring.

* * * * *